United States Patent [19]

Scott Russell et al.

[11] Patent Number: 5,095,186
[45] Date of Patent: Mar. 10, 1992

[54] METHOD FOR MAKING SELECTIVELY METALLIZED MICROWAVE HEATING PACKAGES

[75] Inventors: Norman M. Scott Russell, St. Paul, Minn.; Robert L. Allen, Park Ridge, Ill.

[73] Assignee: Waldorf Corporation, St. Paul, Minn.

[21] Appl. No.: 8,004

[22] Filed: Jan. 29, 1987

[51] Int. Cl.$^5$ .............................. H05B 6/80
[52] U.S. Cl. .................. 219/10.55 E; 219/10.55 F; 426/107; 426/113; 426/243; 99/DIG. 14
[58] Field of Search ............. 219/10.55 E, 10.55 F; 426/107, 113, 234, 241, 243; 99/DIG. 14

[56] References Cited
U.S. PATENT DOCUMENTS

| | | |
|---|---|---|
| 3,924,013 | 12/1975 | Kane .......................... 219/10.55 E |
| 4,122,324 | 10/1978 | Falk . |
| 4,204,105 | 5/1980 | Leveckis et al. . |
| 4,230,924 | 10/1980 | Brastad et al. . |
| 4,267,420 | 5/1981 | Brastad . |
| 4,473,422 | 9/1984 | Parker et al. . |
| 4,555,605 | 11/1985 | Brown et al. . |
| 4,590,349 | 5/1986 | Brown et al. . |
| 4,594,492 | 6/1986 | Maroszek . |
| 4,641,005 | 2/1987 | Seiferth . |
| 4,735,513 | 4/1988 | Watkins et al. .............. 219/10.55 E |

Primary Examiner—Bruce A. Reynolds
Attorney, Agent, or Firm—Dorsey & Whitney

[57] ABSTRACT

The invention is a method for forming package blanks incorporating selectively located microwave absorbing areas for crisping and/or browning one or more surfaces of a packaged product. Successive lengths of an extended web of thin, microwave transparent film are transported past means for depositing a thin layer of microwave energy absorbing material on one side of the film which masking selected areas of the film web by masks placed adjacent the film surface on which the microwave absorbing layer is deposited. No microwave absorbing material is deposited in the selected masked areas. Successive lengths of the resulting film are laminated onto an extended web of flexible dielectric packaging material with the microwave absorbing layer sandwiched between the film and the flexible dielectric packaging material. Thereafter, successive lengths of the resulting laminated web are fed through a die cutting machine that cuts one or more package blanks from the laminated web. The package blanks include both areas incorporating microwave absorbing material and areas free from such material. The invention also includes an article of manufacture made by the method.

18 Claims, 3 Drawing Sheets

METHOD FOR MAKING SELECTIVELY METALLIZED MICROWAVE HEATING PACKAGES

BACKGROUND OF THE INVENTION

1. Field of the Invention

The present invention relates to a method for making a packaging material. More particularly, the invention relates to a method for making a selectively metallized material and package blank for use in microwave heating packages.

2. Description of the Prior Art

The heating of food articles in microwave ovens is now common. Because the molecular friction resulting from microwaves heats materials without browning them or making them crisp in the manner customary with certain foods (e.g., pizza, waffles, fish sticks), various methods of obtaining browning and crisping have been tried. One method that is now achieving wider acceptance is the use of disposable packaging including one or more microwave interactive bodies positioned in contact with or adjacent to the food surfaces or portions desired to be browned and/or crisped, e.g., U.S. Pat. Nos. 4,230,924, 4,267,420, 4,555,605, and 4,590,349.

The packaging material disclosed in U.S. Pat. No. 4,267,420 represents an early effort to make a package material that allows microwave browning of foods by including a thin layer of a microwave interactive substance, such as aluminum, in the packaging material. In U.S. Pat. No. 4,267,420, aluminum is evaporatively deposited onto a plastic film, such as a polyester film. The resulting metallized film is laminated to an additional sheet or film made preferably of polyethylene (although more rigid dielectric materials such as paperboard and the like are also suggested), so that the aluminum microwave interactive layer is sandwiched between two plastic films. This produces a flexible packaging material that can be used as a wrap for fish sticks or other items requiring surface browning. U.S. Pat. No. 4,230,924 discloses an earlier version of this packaging material in which the metallic layer is subdivided into a number of rectangular metallic islands or pads having sides ranging from 1/32 inch to ¾ inch. Also shown in that patent is a plastic film or paperboard substrate that has the metallic islands on one side, namely the side intended for contact with the food to be browned. No second layer of material is contemplated to form a sandwich with the metallic layer in the center.

Another form of packaging material, one that has been put into commercial use, is a composite material in which a metallized polyester film is laminated onto a lightweight kraft paper. This kraft paper is then cut into pieces of the desired size and patched onto pre-die cut paperboard carton blanks. While this places the microwave interactive material in the desired position, the patching operation is an inefficient manufacturing process. Moreover, while the paperboard carton portions covered by the metallized polyester film and kraft paper are protected from moisture and grease, unless the remaining paperboard has been covered with a protective layer, it is vulnerable to these substances. On the other hand, the presence of such a protective layer over the entire paperboard may make it more difficult to effectively attach the patch of microwave interactive material to the paperboard.

U.S. Pat. No. 4,230,924 and 4,267,420 are concerned mainly with defining and describing the configuration of the layered packaging materials involved. Details on the manufacture of the materials, in particular on the mass production of such packaging materials, are sparse. Efficient mass production is necessary if inexpensive disposable packages are to achieve wide use. The deficiencies of the commercially used package described in the preceding paragraph demonstrate that there are practical problems of mass production of microwave heating packages that need to be addressed.

While the preparation of a composite packaging material with microwave interactive qualities appears straightforward, on closer examination, the microwave oven cooking environment poses a number of special problems. First, in microwave cooking, browning may be described only in certain portions of a food item, such as the edges or the fried potatoes in a multiple food item tray ("TV dinner"). Thus, only portions of a package require a microwave interactive layer. Second, microwave ovens have limited power. This makes it desirable to avoid placement of microwave interactive material where no food is contacted, because heating in such areas is primarily wasted. Third, the same qualities that permit metallized materials to heat and up and brown an adjacent food surface can lead to arcing between the metallized material and the oven floor or between overlapped package layers, each of which includes the metallized material (e.g., at a glue joint). All of these factors suggest the desirability of selectively placing microwave interactive materials only where needed on the packaging material. The patch application method previously mentioned can do this but is not suited for efficient mass production.

Another requirement of the microwave cooking environment is that adhesives, coatings and other materials used in packaging must not emit significant amounts of chemicals that may be harmful or that may cause undesirable effects on color, smell or taste of the cooked food products. A further equipment in the microwave cooking environment is that packaging materials that are used for heating foods by intimate contact must not adhere to the food products unduly. These latter factors make it necessary to carefully select all materials in a composite packaging material, particularly the outer layer that contacts food.

Further, a composite material, if constructed of layers, must be joined by adhesives that provide adequate bonding. The bonds must survive freezing or refrigeration as well as microwave oven heating. A package that falls apart before cooking would be unsaleable or at least unappealing to consumers. A package that falls apart during cooking can adversely affect the packaged food. In addition, if the adhesive is to adhere to a selectively metallized plastic film, it must provide adequate bonding both for the metallized and non-metallized portions, which may have quite different surface characteristics.

Additional requirements for microwave heating package materials arise due to the economics of packaging. If microwave cooking packages are to be disposable, the package blanks must be made from quite inexpensive materials. Moreover, the package blanks should, if possible, be suitable for processing on conventional package-making and filling machinery. What is lacking in the prior art is a method for efficiently producing inexpensive packaging materials and packaging blanks in which microwave interactive layers can be selectively placed where desired.

SUMMARY OF THE INVENTION

The present invention involves a method for forming package blanks incorporating selectively located microwave absorbing areas for browning one or more surfaces of a package product. The method comprises providing an extended web of thin, microwave transparent film and transporting successive lengths of the film web past means for depositing a thin layer of microwave energy absorbing material on one side of said film is selected areas. The areas are determined by masks placed adjacent the film surface on which the absorbing layer is deposited. Successive lengths of the resulting film web are laminated onto an extended web of flexible dielectric packaging material with the microwave absorbing layer sandwiched between the film and the flexible dielectric packaging material. Thereafter, successive lengths of the resulting laminated web are fed through a die cutting machine that cuts one or more package blanks from the laminated structure. The resulting blanks include both areas incorporating microwave absorbing material and areas free from such material. The invention also includes an article of manufacture made by the method.

It is an object of the invention to provide an efficient method for mass-producing selectively metallized package blanks for microwave heating packages.

It is another object of the invention to provide a method for efficiently producing paperboard package blanks for microwave heating packages in which only selected areas of the package have microwave absorbing material.

It is a further object of the invention to provide a method for forming a package material made by laminating a selectively metallized plastic film to a flexible substrate, with an adhesive that can survive both freezing and cooking temperatures.

These and other objects of the invention will be more apparent from the following detailed description and accompanying drawings.

DESCRIPTION OF THE PREFERRED EMBODIMENTS

Figure 1:
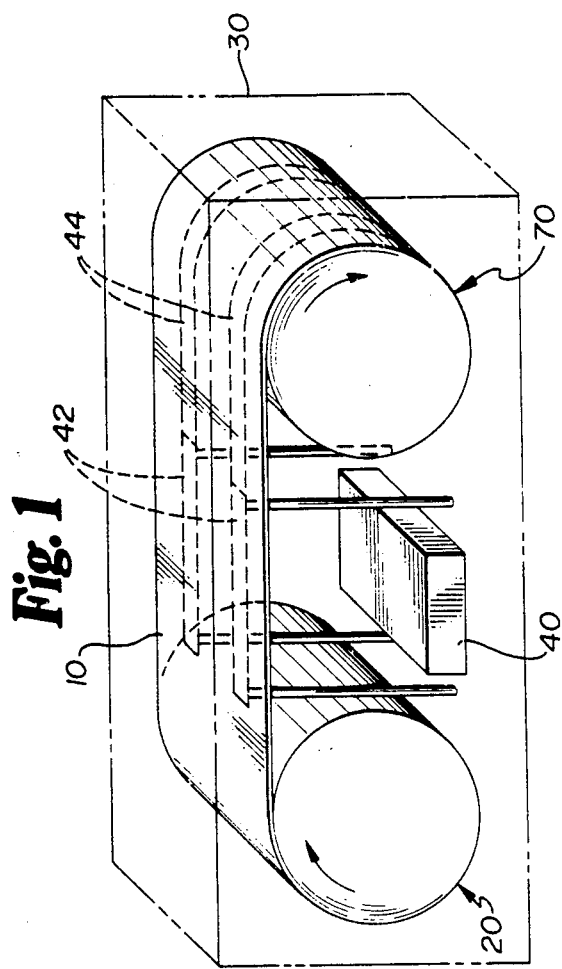
FIG. 1 is a schematic drawing of a production line within a vacuum chamber in which a web of film is selectively metallized in accordance with the initial steps of the invention.

As seen in FIG. 1, the method of the present invention begins with an extended web of plastic film 10 wound into a roll 20 for compactness and easy handling. The plastic film 10 is preferably a transparent polyester film, more preferably a food grade, biaxially-oriented, heat-stable, polyethylene terephthalate. Polybutylene (PBT) terephthalate and poly 4-methyl pentene-1 (TPX) are alternative films. Film thickness may be 35 to 400 gauge with 48 to 92 gauge preferred. The roll 20 of film 10 is placed in a vacuum chamber 30 containing conventional equipment for performing vacuum metallization by evaporation. This includes an array of ceramic evaporative boats 40 in which a metal is heated to its evaporation temperature. The metal is preferably 99.99 percent pure aluminum at 2500 degrees. It may also be silver, gold, nickel, tin, magnesium or copper.

If alloys metals or metal compounds are desired for metallization, a sputtering metallization process would be required. For example, stainless steel, tin oxide or nickel-chrome alloys could be placed on the film 10. In this case, the evaporative boats 40 would be replaced by the appropriate target material 41 and cathode sputtering equipment 45 (see FIG. 3). In the case of stainless steel, a type 316 alloy would be suitable, sputter-deposited at a density leading to an electrical resistance level of 450 to 1100 ohms per square inch, preferably 700 to 1000 ohms per square inch.

The amount of metallization of the film 10 is important, because it is a primary factor in determining the amount of heating that occurs. This affects not only the browning or crisping that is desired but also the extend to which the adjacent film 10 may be cracked or melted. With greater metallization, heating to higher temperatures can be achieved, but film melting or arching may occur. With higher temperatures the release of undesirable volatiles from the film 10 or other materials may also increase. Both phenomena are undesirable for microwave cooking of food. Accordingly, the target cooking temperatures in the metallized layer are in the range from 350 to 450 degrees Fahrenheit. Achieving these temperatures depends not only on metallization but on the extent to which a food product being heated will serve as a heat sink due to its heat capacity. These are primary considerations in determining the degree of metallization.

In the preferred embodiment, the metallization is controlled such that a thin metal layer 12 (approximately 10 to 300 Angstroms in thickness) is deposited and the resulting film has transmission optical density in the approximate range from 0.13 to 0.39, with around 0.20 optical density units preferred. (These figures vary somewhat dependent on measuring techniques.) The desired density may be achieved with conventional evaporative deposit techniques, involving control of the speed of the web of film 10 and the rate of feeding of aluminum wire to the evaporative boat array 40.

As indicated above, a primary objective of the invention is selective placement of the metallized areas. To achieve selective placement of these areas consistent with the continuous processing of extended film webs that is the key to the efficiencies of the inventive methods, masks of various configurations are used. These are interposed between the evaporative boat array 40 and the underside of film 10 on which metal deposit occurs. If the packaging to be produced is such that only longitudinal (in the direction of longest extension of the web of film 10) areas without metallization are needed, this can be achieved by stationary masks 42, placed with appropriate lateral spacing just below the lower surface of the web of film 10, as seen in FIG. 1. With the two masks 42, 42 as shown in FIG. 1, the resulting metallized web of film 10 will have a pair of longitudinal strips 44, 44 without metallization extending the entire length of the web. Each such non-metallized strip 44 is formed by one mask 42. Outside the two unmetallized strips 44 and between the two strips, the film 10 will be metallized with a thin layer of aluminum.

Figure 3:
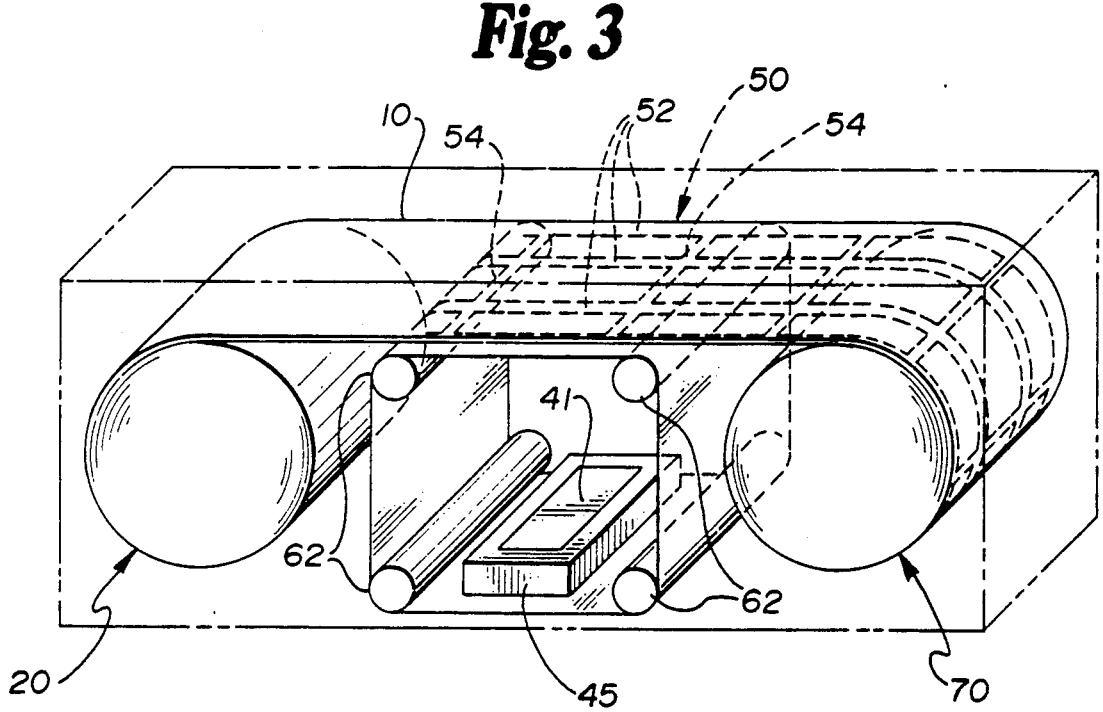
FIG. 3 is a schematic drawing of a production line within a vacuum chamber as in FIG. 1 but with moving rather than stationary masks.

If it is desired to have packaging that has lateral (in a direction transverse to the longest extension of the web of film 10) areas without metallization, or a combination of lateral and longitudinal areas, or if special metallized shapes are desired, a different approach to masking can be used. As best seen in FIG. 3, a moving mask 50 is arranged for circulating movement around cathode sputtering equipment 45 and its target material 41 (which could also be evaporative boats 40 as in FIG. 1). The mask 50 is positioned for this motion by four rollers 62. Two of these lie closely below the web of film 10 and bring the mask 50 into close contact with the lower surface of the film 10. The others help maintain tension and position. One is connected to a drive motor (not shown) for the web of film 10 to provide synchronization. The mask 50 has both longitudinal elements 52 and lateral elements 54. (Note that for drawing simplicity only a portion of the pattern of mask 50 is shown. The pattern would be repeated all along the length of the mask and would contain only complete replications of the pattern.) In fact, the mask 50 could have almost any desired pattern of masking, because its speed of motion is timed to be the same as that of the web of film 10. This permits almost any desired mask configuration to be superimposed on the lower surface of the film 10.

Figure 2:
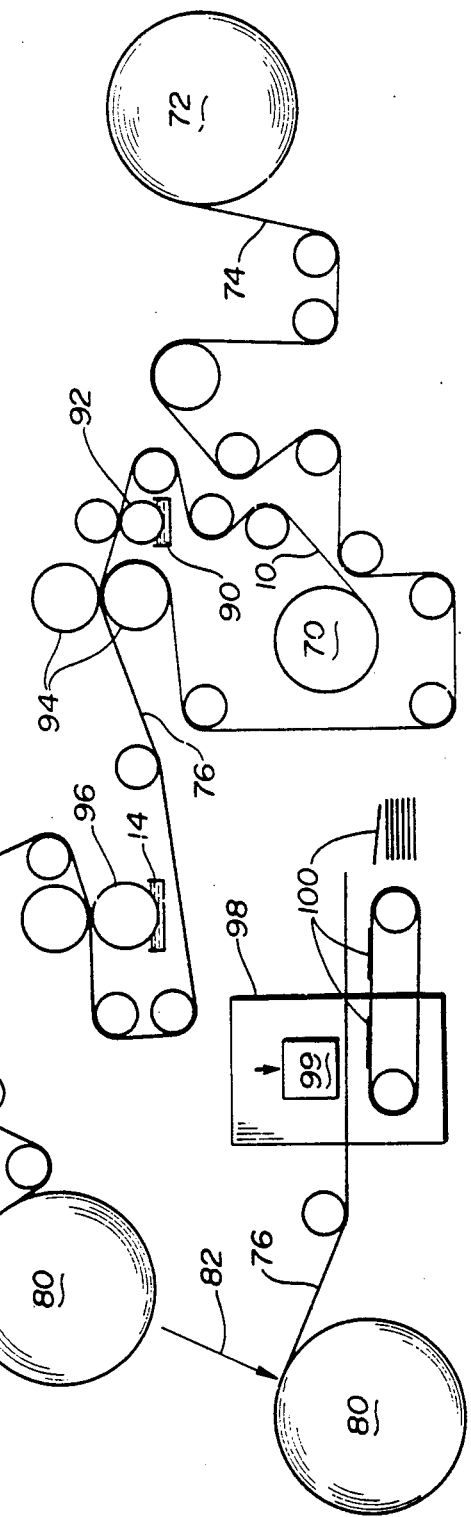
FIG. 2 is a schematic drawing of a production line in which the web of film produced as shown in FIG. 1 is laminated to a substrate and manufactured into package blanks in accordance with the invention.
Figure 4:
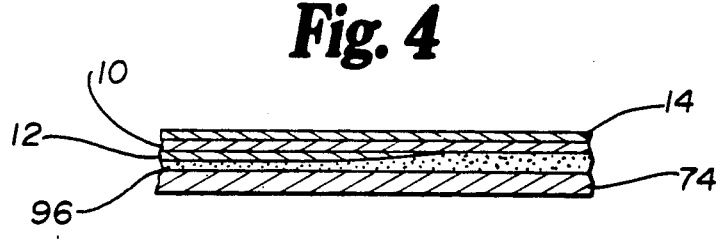
FIG. 4 is a cross-sectional view (greatly enlarged) of a piece of packaging material produced in accordance with the invention and including the layer of deposited metal over a portion of its area.

After the film 10 has been metallized in selected areas by passage over the evaporative boat array 40 (or other metal source), it is wound into a second roll 70. When the second roll 70 is filled with the newly-metallized film 10, it can be removed from the vacuum chamber 30 for further processing. As seen in FIG. 2, the roll 70 serves as input material to a continuous manufacturing process in which a laminated web of packaging material is produced and, if desired, coated with a release coating. The laminated web is thereafter transported (by any suitable means 82) and processed by a cutting machine such as a die cutter 98 into package blanks. FIG. 4 shows, in enlarged cross-section, a piece of the finished laminated web. It includes dielectric substrate 74, adhesive 90, metal layer 12, plastic film 10 and release coat 14. Note that the metal layer 12 is present in only a portion of the piece shown, due to selective metallization.

The two initial inputs to the process shown in FIG. 2 are the roll 70 of metallized film 10 and a roll 72 of dielectric substrate material 74. This dielectric material 74 may be paperboard, paper or another plastic film. Preferably, the dielectric material 74 has a thickness between 0.006 and 0.030 inches for paperboard and 15 to 100 pounds per 3,000 square feet for paper. The paper and paperboard used should be uncoated (non-clay-coated), solid, bleached sulfate type to prevent odor and minimize volatiles during cooking that could affect food flavor.

The selectively metallized film 10 and the dielectric substrate 74 are laminated together with the thin metal layer 12 (where it appears) sandwiched between the substrate 74 and the film 10. The sandwiched position of the metal layer 12 helps to prevent damage, oxidation or removal of the electrically conductive or electromagnetically absorbing metals. The lamination can be effected on conventional equipment.

Choice of the adhesive used in lamination is important because a relatively strong bond must be achieved between the dielectric substrate and both the metallized and unmetallized portions of the plastic film. In the preferred embodiment, dielectric substrate 74 is a non-clay-coated, solid bleached sulfate paperboard and the film 10 is polyester.

Adequate bonding was achieved with a styrene/acrylic copolymer adhesive available commercially as Roymal #41699 from Roymal Inc., Newport, N.H. This particular styrene/acrylic copolymer adhesive contains the following:

| Ingredient | % by weight |
| --- | --- |
| Styrene/acrylic copolymer | 31.41 |
| Surfactants | 2.22 |
| Polydimethylsiloxane fluid | 3.24 |
| Polyethylene | 1.77 |
| Zinc oxide | 4.46 |
| Defoamer | 0.07 |
| Ammonia 26° Baume' | 6.60 |
| Ethylene glycol | 0.43 |
| Water | 49.80 |

The styrene/acrylic copolymer is made up of styrene/methacrylic acid with not less than 95% by weight polymer units derived from styrene. Other styrene/acrylic copolymer adhesives are expected to work also.

Adequate bonding was also achieved with an ethylene/vinyl acetate copolymer adhesive available commercially as #33-1347 from National Adhesives Inc., Chicago, Ill. This particular ethylene/vinyl acetate copolymer adhesive is also water based and contains an ethylene/vinyl acetate copolymer with about 82-86% by weight ethylene. Other ethylene/vinyl acetate copolymer adhesives are expected to work also.

The lamination step is shown schematically in FIG. 2 as application of the adhesive 90 carried by a rotogravure cylinder 92, followed by a pinch-roller pair 94 that compresses the film 10 and dielectric substrate 74 together. Note that the laminated web 76 departs from the pinch roller pair 94 with the plastic film 10 on top as viewed in FIG. 2.

With the previously specified adhesives, the desired adhesive weight is between 1.5 and 6 pounds per 1,000 square feet in the liquid state. The bond strength between the film 10 and the dielectric substrate 74 may vary between 150 and 400 grams per inch width at a 90° peel, with values between 200 and 350 grams preferred. It has been found that stronger bonds are needed where a higher degree of metallization is present and the low heat capacity of the food product lead to higher temperatures. These temperatures cause a greater tendency towards shrinkage in the film 10 and drying of the dielectric substrate 74, if paper or paperboard is used, increasing the chance for delamination of a weak bond.

The laminated web 76 is intended to be used in packaging with the plastic film 10 adjacent the packaged food. Some food products, such as cheese, will stick to the plastic film 10 when heated in a microwave oven. To reduce sticking, the plastic film 10 is preferably coated with a release coating 14. As shown in FIG. 2, this can be applied by a rotogravure cylinder 96 in line with the laminating procedure (although it could also be a subsequent procedure). The release coating 14 must have good heat resistance and adhesion to the surface of plastic film 10. For example, one acceptable coating for a polyester film is an acrylic copolymer (mostly methyl methacrylate) dispersed in water. More specifically, an acceptable release coating polymer system could consist of acrylic copolymers, at least 50% by weight methyl methacrylate, and not more than 5% by weight of total polymer units derived from acids. The balance of the polymer system (less than 45%) consists of additives and polyethylene. Such a composition conforms to Food and Drug Administration Regulation 21 CFR §176.170. An example of a suitable, commercially available material is Roymal #41901, available from Roymal Inc., Newport, N.H. and having the following exact composition:

| Ingredient | % by weight |
| --- | --- |
| Acrylic Copolymer | 16.89 |
| Polyethylene | 12.26 |
| Waxes | 2.29 |
| Surfactant | 2.08 |
| Zinc oxide | 1.38 |
| Silicone | 3.24 |
| Ammonia 26° Baume' | 8.30 |
| Water | 53.56 |

An alternative is lecithin dissolved in a solvent such as toluene (which is removed in the drying process).

The laminated web 76 (with or without release coating) is cured briefly by hot air or other curing means such as the two-stage dryer 97 shown in FIG. 2. Further curing of up to 48 hours at air temperature is also desirable to ensure lamination bond strength. The cured laminated web 76 is preferably wound on a roll 80 that is then ready to be manufactured into package blanks. This is accomplished by transporting the roll 80 by any suitable means 82 to a die cutting machine 98 and feeding the laminated web 76 through the die cutting machine 98, in which die 99 cuts blanks 100 having areas free of microwave absorbing material where no browning or crisping is required. Where the food is to be browned or crisped, the blanks 100 have an area of microwave absorbing material, selectively located in prior steps in the present method.

Figure 5:
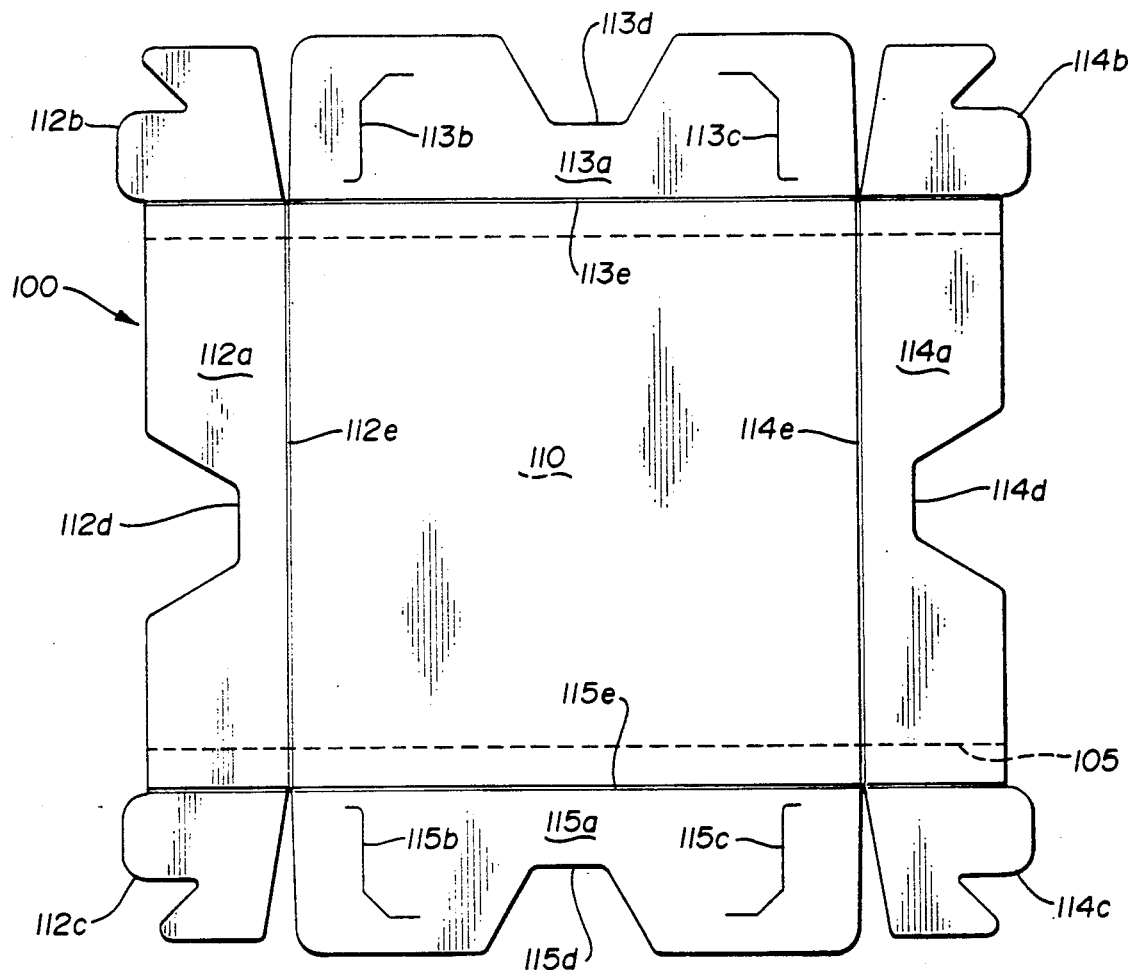
FIG. 5 is a plan view of an example of a package blank made in accordance with the present invention.
Figure 6:
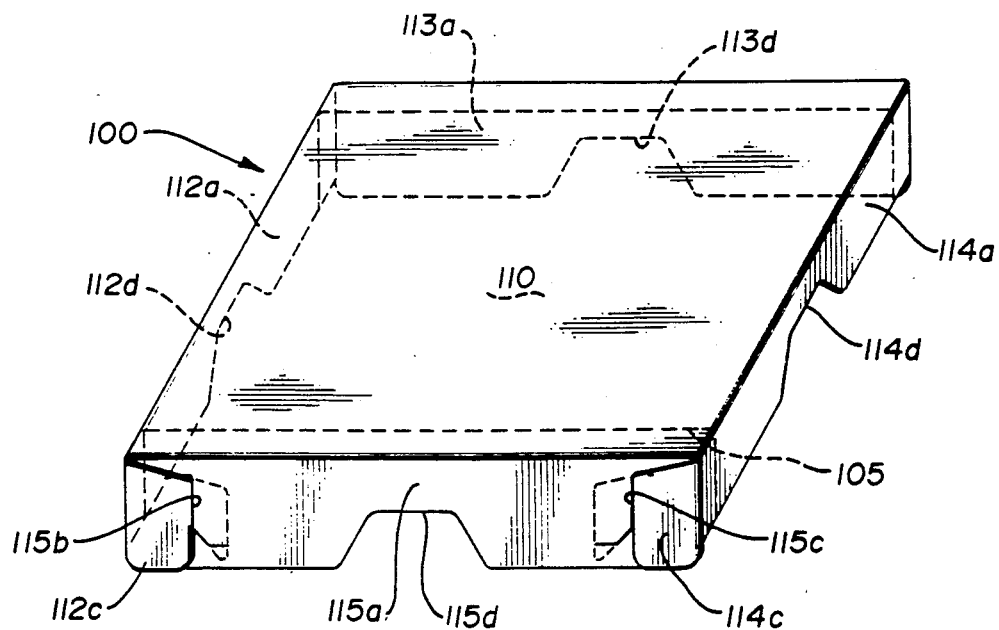
FIG. 6 is a pictorial view of the package blank of FIG. 5 after assembly.

A specific example of a package black 100 made by utilizing the present invention consists of a food tray that can be inverted to form an elevated cooking shelf on which pizza or other foods that need browning or crisping on the underside may be placed. As seen in FIGS. 5 and 6, the tray blank 100 consists of a rectangular center panel 110 surrounded by four side panels 112a, 113a, 114a, 115a. Each of the opposing side panels 113a, 115a has a ventilation opening 113d, 115d, respectively, cut into its exterior edge. Each also ha a pair of assembly slots 113b, 113c and 115b, 115c, respectively, cut into its ends. Each panel 113a, 115a, is joined to the center panel 110 at a fold line 113e, 115e, respectively.

Each of the opposing side panels 112a, 114a also has a ventilation opening 112d, 114d, respectively, cut into its exterior edge. Each also has attached to it a pair of corner assembly panels 112b, 112c and 114b, 114c, respectively. These are joined to the ends of each panel 112a, 114a at fold lines that are extensions of fold lines 113e and 115e. Running continuously across all but the upper and lower edges of each of the panels 112a, 110 and 114a is a metallized strip 105. Other portions of the tray blank 100 are covered by the plastic film 10 laminated to the dielectric substrate 74, but they lack the metal layer 12.

For assembly, as shown in FIG. 6, the various side and corner panels are folded at 90 degrees along fold lines 112e, 113e, 114e and 115e. The pointed tips of corner panels 112b, 112c, 114b and 114c are inserted into assembly slots 113b, 115b and 113c, 115c, respectively. (Note: for drawing simplicity, only flaps 112c and 114c are shown in FIG. 6). The metallized strip 105 on panel 110 provides a browning platform for pizza placed on the panel 110. The platform is raised above the oven floor and ventilated for improved cooking. Note that to avoid arcing from these portions of the metallized strip 105 on panels 112a and 114a to the oven floor and to further facilitate ventilation, the exterior edges of panels 112a and 114a are recessed above the oven floor.

The blank 100 can be manufactured by use of simple longitudinal masks 42 as shown in FIG. 1. In fact, a laminated web from which more than one row of such blanks can be cut is produced if the masks 42 are used to form two or more longitudinal strips of appropriate width extending the length of the web of film 10. Each of these strips can, with appropriate die cutting keyed to the center of the strips, form the strip 105 shown in FIGS. 5 and 6. To reduced further the metallized areas that are not needed for browning or crisping, a more complex masking arrangement as shown in FIG. 3 could be used to interrupt the longitudinal strips. This could avoid unnecessary metallization on the panels 112a, 114a that are not normally in contact with food.

While it is not a problem in the tray blank 100, the type of locked corner used in its construction is an example of an overlap area occuring in microwave packaging in which arcing might result if both surfaces in the overlap were metallized. The potential problem in this common construction (or in a glue joint) can be avoided by selective metallization that prevents metallization on one or both of such overlapping panels.

As can be seen, with the method of the present invention it is possible to efficiently manufacture by mass production utilizing large rolls of flexible materials a laminated web of packaging materials and packaging blanks. These blanks have microwave absorbing areas where desired by virtue of selectively metallizing of the plastic film laminated to the dielectric substrate. Because the plastic film covers one entire side of the blank, this side, against or adjacent which the product to be browned is placed resists moisture and grease absorption. Heating occurring only in the metallized, microwave absorbing area causes browning only where desired. The use of appropriate materials reduces undesirable volatiles and aids in forming a strong lamination bond, so that debonding will not occur during freezer or refrigerator storage or during heating.

It will be seen by those skilled in the art that various changes may be made without departing from the spirit and scope of the invention. For example, it will be clear that the metallization could be implemented by sputtering rather than evaporation. The lamination adhesive and release coat could be applied by other methods. The invention is therefore not limited to what is shown in the drawings and described in the specification but only as indicated in the appended claims.

What is claimed as new and desired to be protected by Letters Patent is:

1. A method for forming package blanks incorporating selectively located microwave absorbing areas for heating one or more surfaces of a packaged product, comprising the steps of:

(a) providing an extended web of thin, microwave transparent film for contacting said product;

(b) transporting successive lengths of the film web past means for selectively depositing a thin layer of microwave energy absorbing material on one side of said film web, said layer being of sufficient thickness that when exposed to microwaves it will heat to temperatures capable of producing browning in food placed closely adjacent said layer but separated from said layer by the film web, whereby microwave absorbing material is not deposited in those areas where heating to browning temperatures is not desired;

(c) laminating successive lengths of the resulting film web onto an extended web of dielectric packaging material with one adhesive in a manner to cause the selected areas of microwave absorbing material to be sandwiched between the film and the dielectric packaging material and to cause both the areas with deposited microwave absorbing material and those without such material to be held by said one adhesive in bonded relationship with said dielectric packaging material; and (d) feeding successive lengths of the resulting laminated web through a cutting machine that cuts package blanks from the laminated web, such blanks including both areas incorporating microwave absorbing material and areas free from such material and having a covering of said film on one entire side of said blanks, said one entire side being the side that contacts the product during heating.

2. The method as recited in claim 1 further comprising, between steps (c) and (d), the step of applying a release coating to the film-covered surface of the laminated web.

3. The method as recited in claim 1 wherein step (a) comprises providing a polyester film of thickness 35 to 400 gauge.

4. The method recited in claim 1 wherein step (b) comprises transporting successive lengths of the film web past means for evaporatively depositing on the film web a microwave interactive material that is an electrically conductive metal.

5. The method as recited in claim 4 wherein vaporized aluminum is evaporatively deposited on the film web.

6. The method as recited in claim 5 wherein the aluminum is deposited to a controlled transmission density value of 0.13 to 0.39 optical density units.

7. The method recited in claim 1 wherein step (b) comprises transporting successive lengths of the film web past means for sputter-depositing on the film web a microwave interactive material selected from the group consisting of electrically conductive metals, electromagnetically absorbing metals and metal compounds.

8. The method recited in claim 7 wherein stainless steel is sputter deposited on the film web.

9. The method as recited in claim 1 where step (c) comprises laminating the resulting film web to paperboard using a water based styrene/acrylic copolymer adhesive.

10. The method as recited in claim 1 wherein step (c) comprises laminating the resulting film web to paperboard using a water based ethylene/vinyl acetate copolymer adhesive.

11. The method as recited in claim 1 wherein step (c) comprises laminating the resulting film web to uncoated, solid bleached sulphate paperboard.

12. The method as recited in claim 1 wherein step (b) comprises selectively depositing microwave energy absorbing material on the film web so as to form areas free from microwave absorbing material where portions of a package blank will be overlapped.

13. An article of manufacture for packaging foods that are heated in microwave ovens comprising:
 a thin layer of dielectric packaging material comprising a material selected from the group consisting of paper, paperboard and plastic film;
 a thin, microwave transparent film comprising material selected from the group consisting of polyethylene terephthalate, polybutylene terephthalate and poly 4-methyl pentene-1, said transparent film having selected areas of one side covered by a thin layer of microwave energy absorbing material, corresponding to those areas where a surface heating effect on a food product is desired, and non-selected areas where no microwave energy absorbing material is present, said transparent film covering one entire side of the layer of dielectric packaging material; and
 a layer of water-based styrene/acrylic copolymer adhesive interposed between said one side of the microwave transparent film and said dielectric packaging material, said adhesive providing bonding between said dielectric packaging material and both said selected and non-selected areas of said film to form a layered laminate in which said microwave transparent film is adapted to contact said food during heating.

14. The article of manufacture of claim 13 wherein the water based styrene/acrylic copolymer adhesive contains a styrene/acrylic copolymer made up of styrene/methacrylic acid with not less than 95% by weight polymer units derived from styrene.

15. The article of manufacture of claim 14 wherein the dielectric packaging material comprises paperboard and the microwave transparent film comprises polyester.

16. An article of manufacture for packaging foods that are heated in microwave ovens comprising:
 a thin layer of dielectric packaging material comprising a material selected from the group consisting of paper, paperboard and plastic film;
 a thin, microwave transparent film comprising material selected from the group consisting of polyethylene terephthalate, polybutylene terephthalate and poly 4-methyl pentene-1, said transparent film having selected areas of one side covered by a thin layer of microwave energy absorbing material, corresponding to those areas where a surface heating effect on a food product is desired, and non-selected areas where no microwave energy absorbing material is present, said transparent film covering one entire side of the layer of dielectric packaging material; and
 a layer of water based ethylene/vinyl acetate copolymer adhesive interposed between said one side of the microwave transparent film and said dielectric packaging material, said adhesive providing bonding between said dielectric packaging material and both said selected and non-selected areas of said film to form a layered laminate in which said microwave transparent film is adapted to contact said food during heating.

17. The article of manufacture of claim 16 wherein the water based ethylene/vinyl acetate copolymer adhesive contains an ethylene/vinyl acetate copolymer made up of about 82-86% by weight ethylene.

18. The article of manufacture of claim 17 wherein the dielectric packaging material comprises paperboard and the microwave transparent film comprises polyester.

* * * * *